(12) United States Patent
Halliday et al.

(10) Patent No.: US 10,274,621 B2
(45) Date of Patent: Apr. 30, 2019

(54) SEISMIC RECEIVERS AS SEISMIC SOURCES

(71) Applicant: WESTERNGECO L.L.C., Houston, TX (US)

(72) Inventors: David Fraser Halliday, Cherry Hinton (GB); Julian Edward Kragh, Great Bardfield (GB); Pascal Edme, Cambridge (GB); David Neser, Asker (NO); Martin Howlid, Blommenholm (NO)

(73) Assignee: WESTERNGECO L.L.C., Houston, TX (US)

( * ) Notice: Subject to any disclaimer, the term of this patent is extended or adjusted under 35 U.S.C. 154(b) by 106 days.

(21) Appl. No.: 14/353,725

(22) PCT Filed: Nov. 26, 2012

(86) PCT No.: PCT/IB2012/002490
§ 371 (c)(1),
(2) Date: Apr. 23, 2014

(87) PCT Pub. No.: WO2013/076572
PCT Pub. Date: May 30, 2013

(65) Prior Publication Data
US 2014/0293741 A1    Oct. 2, 2014

Related U.S. Application Data

(60) Provisional application No. 61/563,686, filed on Nov. 25, 2011.

(51) Int. Cl.
*G01V 1/02* (2006.01)
*G01V 1/18* (2006.01)
(Continued)

(52) U.S. Cl.
CPC ............... *G01V 1/02* (2013.01); *G01V 1/003* (2013.01); *G01V 1/145* (2013.01); *G01V 1/20* (2013.01); *G01V 1/181* (2013.01)

(58) Field of Classification Search
CPC . G01V 1/20; G01V 1/003; G01V 1/28; G01V 1/02; G01V 1/145; G01V 1/181
(Continued)

(56) References Cited

U.S. PATENT DOCUMENTS 3,264,606 A  *  8/1966  Crook et al. ............ G01V 1/02
                                                        367/39
3,806,864 A  *  4/1974  Broding ................. G01V 1/223
                                                        346/14 MR
(Continued)

OTHER PUBLICATIONS

International Search Report of PCT Application No. PCT/IB2012/002490 dated Apr. 30, 2013: pp. 1-5.
(Continued)

*Primary Examiner* — Ian J Lobo

(57) ABSTRACT

Seismic surveying techniques are described in which seismic receivers in a seismic array are used as seismic sources. These receiver-sources may be used to determine the near-surface structures of the Earth, geometric properties of the survey array, receiver locations and operations of the survey array. The receiver-sources may be driven by drive sequences to produce amplified receiver-source signals, plane waves, surface waves converging towards a point inside the seismic array, surface waves sweeping through the seismic array and/or the like. The receiver-sources may comprise geophones, hydrophones, accelerometers and/or the like. A driver may be used to drive the receiver-sources and the driver may be controlled by a processor. By encoding drive sequences, seismic data generated by the receiver-sources may be separated from seismic data generated by another seismic source in the seismic array. Similarly, seis-
(Continued)

mic data can be separated by controlling the frequency of seismic signals produced by the receiver-sources.

27 Claims, 10 Drawing Sheets

(51) Int. Cl.
  *G01V 1/00* (2006.01)
  *G01V 1/20* (2006.01)
  *G01V 1/145* (2006.01)
(58) Field of Classification Search
  USPC .............................................. 367/54, 56–58
  See application file for complete search history.

(56) References Cited

U.S. PATENT DOCUMENTS

| | | | | |
|---|---|---|---|---|
| 5,010,976 | A * | 4/1991 | Airhart | G01V 1/362 |
| | | | | 181/108 |
| 5,166,905 | A * | 11/1992 | Currie | G01S 5/30 |
| | | | | 367/19 |
| 5,231,252 | A * | 7/1993 | Sansone | G01V 1/16 |
| | | | | 181/112 |
| 5,235,857 | A * | 8/1993 | Anderson | G01S 7/6245 |
| | | | | 73/625 |
| 5,877,995 | A | 3/1999 | Thompson et al. | |
| 6,477,113 | B2 | 11/2002 | Hornbostel et al. | |
| 6,661,738 | B1 * | 12/2003 | da Silva | G01V 1/46 |
| | | | | 340/853.8 |
| 7,408,836 | B2 | 8/2008 | Muyzert et al. | |
| 7,492,665 | B2 | 2/2009 | Robertsson et al. | |
| 7,898,904 | B2 | 3/2011 | Arnegaard et al. | |
| 8,121,823 | B2 | 2/2012 | Krebs et al. | |
| 2005/0068850 | A1 | 3/2005 | Muyzert et al. | |
| 2006/0155758 | A1 | 7/2006 | Arnegaard et al. | |
| 2008/0019215 | A1 | 1/2008 | Robertsson et al. | |
| 2010/0018718 | A1 | 1/2010 | Krebs et al. | |
| 2010/0185089 | A1 * | 7/2010 | Gourevitch | A61B 5/417 |
| | | | | 600/443 |
| 2010/0300681 | A1 | 12/2010 | Dai | |
| 2011/0120724 | A1 | 5/2011 | Krohn | |

OTHER PUBLICATIONS

Hagedoorn et al., "A practical set of guidelines for geophone element testing and evaluation," First Break, Oct. 1988, vol. 6(10): pp. 325-331.
Haines, "Design and Application of an electromagnetic Vibrator Seismic Source," JEEG, Mar. 2006, vol. 11(1): pp. 9-15.
Rönnow et al., "Instrument test in a point-receiver land seismic system," SEG Denver Annual Meeting, 2010: pp. 127-131.
Spencer et al., "Travel-time inversion for simultaneous earthquake location and velocity structure determination in laterally varying media," Geophys. J. R. astr. Soc., 1980, vol. 63: pp. 95-116.
Strobbia et al., "Attenuation of aliased coherent noise: model-based attenuation for complex dispersive waves," first break, Aug. 2011, vol. 29: pp. 93-100.
Washburn et al., "The Effect of the Placement of a Seismometer on its Response Characteristics," Geophysics, 1941, vol. 6(2): pp. 116-131.
Yilmaz, "Chapter 3: Velocity Analysis and Statics Corrections," Seismic Data Analysis Processing, Inversion, and Interpretation of Seismic Data vol. 1, Society of Exploration Geophysicists: Tulsa, ed. Doherty, 2001: pp. 271-461 (3 attachments).

\* cited by examiner

SEISMIC RECEIVERS AS SEISMIC SOURCES

CROSS-REFERENCE TO RELATED APPLICATIONS

This application is a U. S. National Stage Application under 35 U.S.C. § 371 and claims priority to Patent Cooperation Treaty Application No. PCT/IB2012/002490 filed on Nov. 26, 2012, which claims the benefit of U. S. Provisional Application Ser. No. 61/563,686filed on Nov. 25, 2011, by the same inventors, the disclosures of which are incorporated herein by reference in their entireties.

BACKGROUND

This disclosure relates to seismic exploration for oil and gas and, in particular but not by way of limitation, relates to the usage of seismic receivers (e.g. geophones or the like) as sources in order to generate information on near-surface structures of the Earth and/or for analyzing a layout/arrangement of devices (such as seismic receivers, seismic sources and including the seismic receivers being used as sources) in the seismic survey.

Seismic exploration may involve surveying subterranean geological formations for hydrocarbon deposits. A survey may involve deploying seismic source(s) and seismic receivers at predetermined locations. The seismic sources are used to generate seismic waves, which propagate into the geological formations, creating pressure changes and vibrations along the way. Changes in elastic properties of the geological formation scatter the seismic waves, changing properties of the waves, including the direction of propagation of the waves. In a seismic survey, part of the energy emitted by the seismic sources and scattered by the subterranean formations reaches the seismic receivers. Some seismic receivers are sensitive to pressure changes (e.g. hydrophones or the like) and others are sensitive to particle motion (e.g., geophones or the like); a seismic survey may include us one or both types of seismic receivers. In response to the scattered and received seismic waves, the seismic receivers generate electrical signals or the like, which signals comprise seismic data. The seismic data generated by the seismic receivers may be processed to produce an image of an interior section of the Earth, produce parameters representative of properties of an interior section of the Earth, which parameters may indicate the presence or absence of probable locations of hydrocarbon deposits, and/or the like.

Some seismic surveys are known as "marine" surveys because the survey is conducted in marine environments. "Marine" surveys may be conducted in saltwater environments, fresh water environments and brackish water environments. In one type of marine survey, called a "towed-array" survey, an array of one or more seismic sources and one or more streamers containing seismic sensors is towed behind a survey vessel.

Seismic surveys conducted on land are known as "land" surveys. FIG. 1 illustrates a land seismic survey layout, which will be described in more detail below. Land surveys may use dynamite, seismic vibrators and/or the like as seismic sources. In a land survey, arrays of seismic sensor-containing cables are laid on the ground to receive seismic signals generated by seismic sources and reflected, scattered and/or the like from subterranean formations/features. In the survey, seismic signals may be converted to electrical signals, digitized, stored and/or transmitted by the seismic sensors/receivers to data storage and/or processing facilities nearby, e.g. a recording truck. Land surveys may use wireless seismic receivers to avoid the limitations of cables. Some seismic surveys may be conducted in areas between the land and the sea, which is often referred to as the "transition zone".

Seabed seismic survey, which may incorporate the use of both hydrophones and geophones, may be conducted on the seabed.

Depending on the survey environment, the sources used in the seismic survey may comprise airguns, waterguns, marine vibrators and/or the like for marine seismic surveys; vibrators, dynamite and/or the like for land seismic surveys. The receivers used in the seismic survey may also vary. For example, the seismic receivers may be geophones, which measure earth movement; the receivers may be hydrophones, which measure pressure waves (i.e. sound); or the receivers may be accelerometers, which measure the acceleration of particles in water or earth giving an indication/measurement of earth motion or pressure waves. In seismic surveys, the seismic receivers convert the changes in the measured physical parameters into electrical signals that can be digitized, processed and/or interpreted.

In a seismic survey, a geophone may be designed to generate a voltage in response to a movement of the Earth/an Earth formation.

FIG. 2 illustrates components of a geophone 200 for use in a seismic survey. The geophone 200 comprises a mass 210 that is suspended from a spring 215 and the spring 215 in turn is attached to a body 220 (e.g., the casing of the geophone or the like) that is coupled to a ground surface of the Earth 250. The mass 210 is surrounded by a magnet 230, and a conducting wire 240 is coiled around the mass 210, with the wire 240 forming an electrical circuit 245 including an electrical output sensor 260 (i.e., a voltmeter or the like). The electrical circuit 245 may also comprise an amplifier (not shown).

When the ground surface 250 moves, the mass 210 and the coiled conducting wire 240 move relative to the magnet 230. The movement of the coiled conducting wire 240 within the magnetic field of the magnet 230 produces an electrical current in the conducting wire 240, and this current can measured as an electrical output 270 by the electrical output sensor 260. The output voltage measured by the electrical output sensor 260 is proportional to the displacement of the ground surface 250.

A hydrophone is a device designed for use in detecting pressure changes (i.e. sound, acoustic waves and/or the like). Hydrophones may comprise transducers that convert sound signals/acoustic signals into electrical signals. Hydrophones may be used under water in a marine seismic survey during marine seismic acquisition. Hydrophones may be deployed in a seismic survey in a streamer, which comprises an elongated housing containing a plurality of hydrophones, that may be towed by a seismic vessel, deployed down a borehole and/or the like.

FIG. 3 illustrates a hydrophone 300. The hydrophone 300 comprises a pressure transducer 310 for converting pressure changes into electrical signals and a pair of wires 320 for outputting the electric signals indicating the changes in pressure.

An accelerometer is a device used in a seismic survey to measure an acceleration of an Earth surface, where the acceleration of the Earth surface is produced in response to the injection of seismic energy into the Earth by a seismic source, such as a vibrator or the like. An accelerometer converts the acceleration of an object into an electrical signal. An accelerometer may be used measure the acceleration of a particle in water, which measurement is indicative/provides a measurement of a sound/acoustic wave traveling in the water.

Two examples of accelerometers are shown in FIGS. 4a and 4b. FIG. 4a illustrates a Micro Electro-Mechanical System ("MEMS") type accelerometer 401, in which most components are included inside an integrated circuit ("IC") chip 450. The accelerometer 401 may be used to measure acceleration of an object in an X 410 direction, a Y 420 direction and a Z 430 direction and the measured accelerations may be read by a machine or a microprocessor (not shown) via an input/output interface 440.

FIG. 4b illustrates another type of accelerometer 402, which is similar to a geophone except that the output signal indicates the acceleration of an object rather than the displacement or the velocity of the object. In FIG. 4b, the accelerometer 402 measures acceleration in one direction 455, which direction is perpendicular to a base 460 of the accelerometer 402. The accelerometer 402 may comprise an internal Faraday shield 462, impedance matching electronics 465, inertial mass 470, sensing element 480 and a signal outlet 490.

One or more types of receivers may be used in a seismic survey to measure various characteristics of seismic waves generated in a seismic survey, the analysis of which may identify properties of subsurface earth structures, be used to generate images of subterranean formations and/or identify subsurface locations of valuable resources, such as hydrocarbons.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In embodiments of the present invention, seismic receivers (e.g. geophones or the like) may be used as seismic "sources." In embodiments of the present invention, the receivers may be used in a seismic survey to generate seismic waves, in place of seismic sources (e.g. the seismic receiver may be used as a seismic source in place of a seismic source such as a seismic vibrator or the like). In aspects of the present invention, there may be several different configurations in the seismic survey in which the seismic receiver(s) may be used as a source(s). Merely by way of example, in aspects of the present invention, in a seismic survey in which a normal source is replaced by one or more "source geophones"—i.e, a seismic receiver that is being used as a seismic source—the seismic data generated by use of the source geophone may be used to determine properties of the near-surface structure of the Earth. The seismic data generated by the geophone source may be interpreted in the same way as with a survey using a conventional seismic source.

In another aspect of the present invention, the seismic receiver(s) being used as a seismic source may provide a seismic wavefield that may be received by other seismic receivers in a seismic array and processed to determine a location of one or more of the seismic receivers in the seismic array. In some aspects, that seismic receivers being used as seismic sources may be adapted to function purely as a seismic source. Unlike the conventional seismic sources. The adapted seismic receiver-sources produce a smaller seismic wavefield in the Earth, are smaller than the conventional seismic source, may be driven in a group to produce a non-point source wavefield and/or the like.

In embodiments of the present invention, the seismic receivers may be operated as seismic sources or seismic receivers at different times during a seismic survey. In aspects of the present invention, the receiver "sources" may be activated at selected times or in sequences to produce desired source characteristics. The receiver "sources" may be geophones, accelerometers or hydrophones, and the receiver-sources may comprise seismic receivers modified to be more efficient in terms of weight, power, efficiency etc. In some aspects, the receiver-sources may be dedicated devices that are used alongside/in combination with dedicated seismic receivers at specific locations in the seismic survey/acquisition spread. In embodiments of the present invention, besides near-surface structure interpretation or the like, receiver-sources may be used to determine survey layout/survey configuration, receiver(s) location(s), source location(s), receiver-source location(s) and/or the like.

BRIEF DESCRIPTION OF DRAWINGS

Embodiments of this disclosure are described with reference to the following figures. The same numbers are used throughout the figures to reference like features and components. A better understanding of the methods or apparatuses can be had when the following detailed description of the several embodiments is considered in conjunction with the following drawings, in which:

FIG. 8 illustrates an example of data produced by a sledgehammer, as in FIG. 5a.

DETAILED DESCRIPTION

Figure 1:
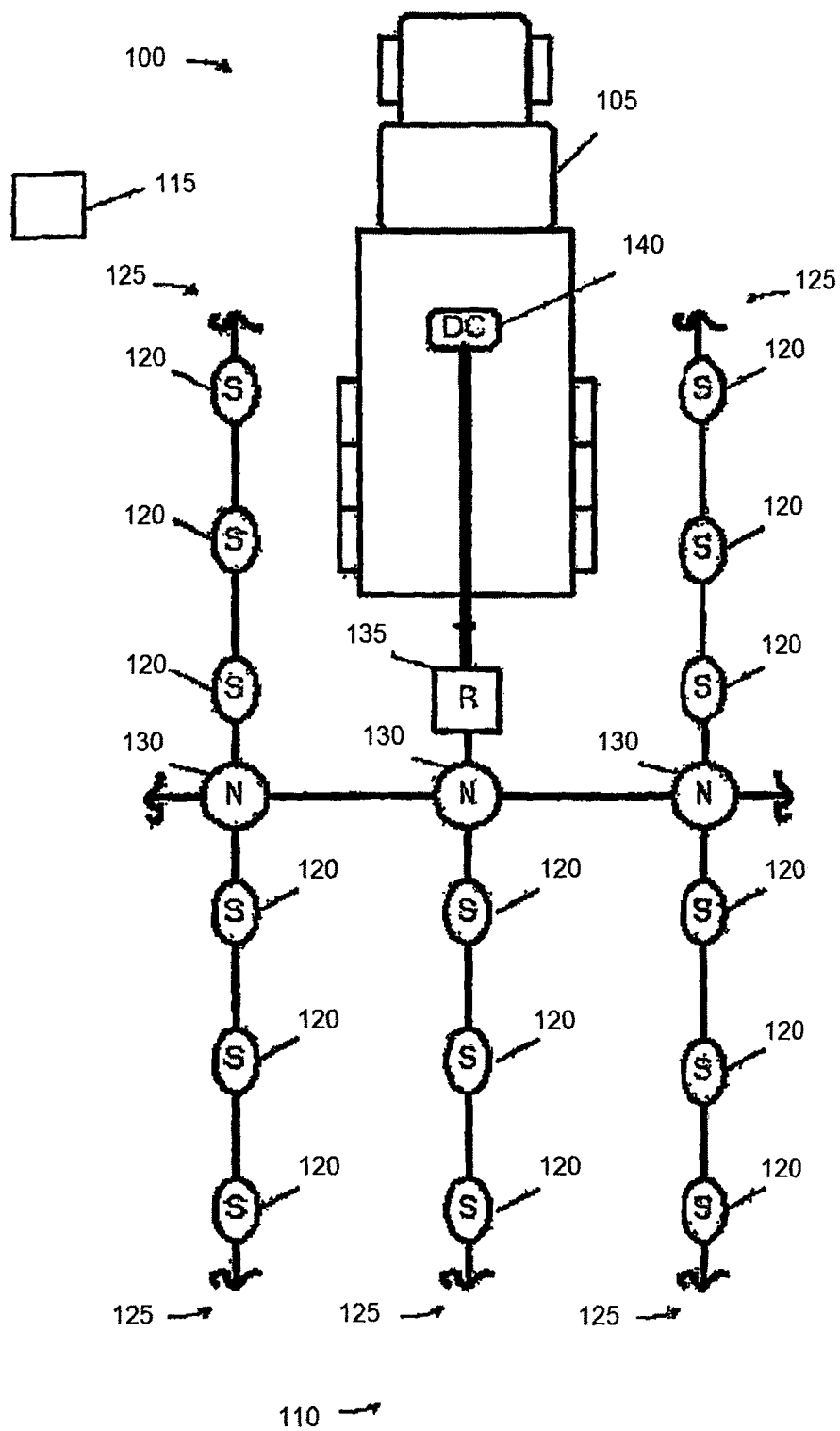
FIG. 1 illustrates a seismic acquisition system in a land environment, which may be used with receiver-sources, in accordance with an embodiment of the present invention.

Reference will now be made in detail to embodiments, examples of which are illustrated in the accompanying drawings and figures. In the following detailed description, numerous specific details are set forth in order to provide a thorough understanding of the subject matter herein. However, it will be apparent to one of ordinary skill in the art that the subject matter may be practiced without these specific details. In other instances, well-known methods, procedures, components, and systems have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step. The first object or step, and the second object or step, are both objects or steps, respectively, but they are not to be considered the same object or step.

The terminology used in the description of the disclosure herein is for the purpose of describing particular embodiments only and is not intended to be limiting of the subject matter. As used in this description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Applicants have found that seismic receivers, such as geophones or the like, that are used in seismic surveys may be used to generate a seismic signal and thereby act as a seismic source. While the seismic receivers may only be able to produce small signals in comparison to regular/conventional seismic sources, it was found that useful information could be generated from the seismic signals generated by the seismic receivers. For example, in embodiments of the present invention, the seismic signals produced from the seismic receivers may be used to generate near surface seismic data, determine seismic source location and/or the like. Further, it was found that by applying selected drive sequences to a plurality of seismic receivers the seismic signals generated by the plurality of seismic receivers may be intensified, shaped, directed, plain waves, encoded so that the data produced by the signals and or the signals can be distinguished from the regular seismic signals or the data produced by the regular seismic signals, be frequency banded so that the data produced by the signals and or the signals can be distinguished from the regular seismic signals or the data produced by the regular seismic signals and/or the like.

FIG. 1 illustrates a land-based seismic survey system 100 such as may be used with receiver-sources, in accordance with an embodiment of the present invention. The seismic survey system 100, comprises a recording truck 105 connected to a seismic array 110. The seismic array 110 comprises a plurality of seismic receivers 120 on a plurality of lines 125 (three vertical lines are shown); the lines may in some aspects comprise the seismic receivers 120 linked together by cables. Other devices may also be located at the receiver locations, such as, seismic sources (e.g., vibrators, explosive charges), positioning sensors (Global Positioning System ("GPS") sensors) etc. Some seismic sources, e.g., the seismic source 115, might be located at different places and not be a part of the recording array 110. The recording array 110 may include a plurality of nodes 130 and at least one router 135 for relaying communications between data collection system 140 and the data sources 120. The data sources 120 and nodes 130 in the recording array 110 may also have various functions depending on the various implementations, as will be discussed below.

The seismic survey system 100 may include at least one data collection system 140. The recording truck 105 may be equipped with a rack-mounted computing apparatus 1300, illustrated in FIG. 13, with which at least a portion of control system, data collection and processing system 140 is implemented.

In seismic surveys, seismic receivers are used to receive seismic waves and convert the seismic waves into electrical signals, which may be digitized for further processing and interpretation. In an embodiment of the present invention, the seismic receivers 120 may be used as seismic sources, wherein electric signals may be applied to the seismic receivers 120, and may drive the seismic receivers 120 to emit "seismic" waves/signals.

Figure 2:
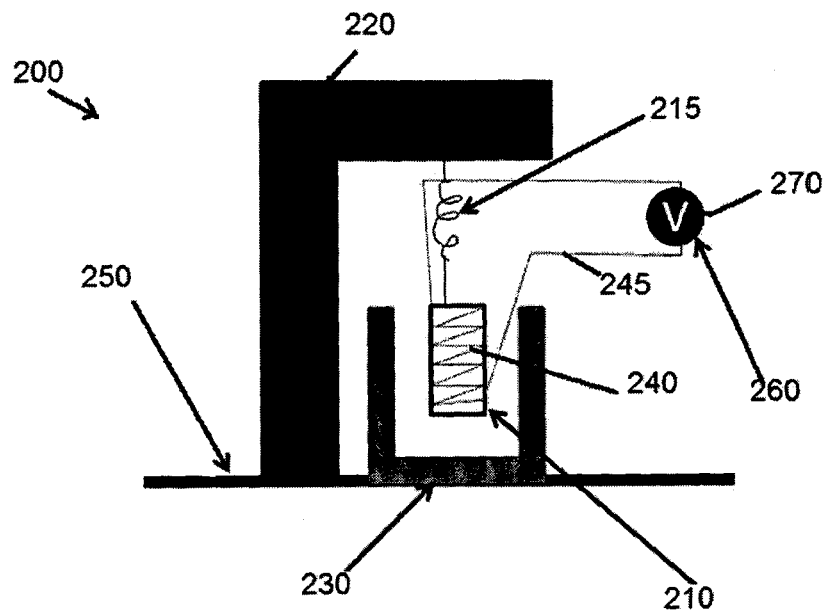
FIG. 2 illustrates a geophone, which may be used as a receiver-source, in accordance with an embodiment of the present invention.
Figure 3:
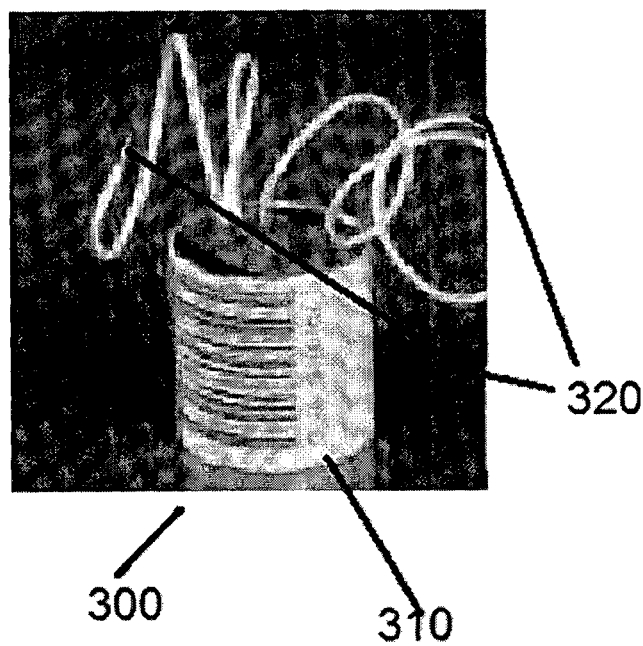
FIG. 3 illustrates a hydrophone, which may be used as a receiver-source, in accordance with an embodiment of the present invention.
Figure 4A:
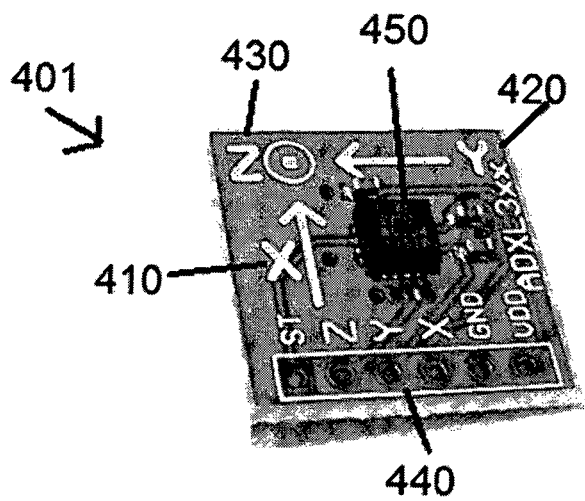
FIG. 4a illustrates a MEMS-type accelerometer and FIG. 4b illustrates a piezo-electric-type accelerometer, both of which may be used as receiver-sources, in accordance with embodiments of the present invention.
Figure 4B:
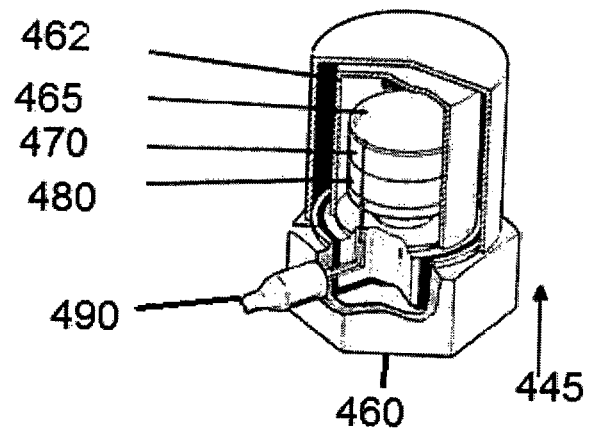

For example, referring to FIG. 2, if a geophone is inverted, i.e., instead of measuring an electrical output 270 from a geophone output circuit 245, a voltage may be applied to the circuit 245, the resulting current flowing through coil 240 will force a mass 210 to move relative to a magnet 230. Thus, in an embodiment of the present invention, the mass 210 can be moved by applying a voltage; in convention geophone operation the motion of the mass 210 in response to seismic signals (acoustic waves etc.) is used to produce the electrical output (voltage) 270, which output is used to measure properties of the seismic signals. When coupled to ground 250, the movement of the mass 210 in the inverted operation will generate a seismic wave, though the seismic wave energy is very small compared to a regular seismic source such as an explosion, a vibrator in a land survey or an airgun in a marine survey. Similarly, in other embodiments, other seismic receivers may be inverted, i.e. driven by an electric signal to create a seismic wave in the Earth. In embodiments of the present invention, using seismic receivers as sources may provide many measurements or insights into the Earth structures that cannot be obtained otherwise.

Figure 5A:
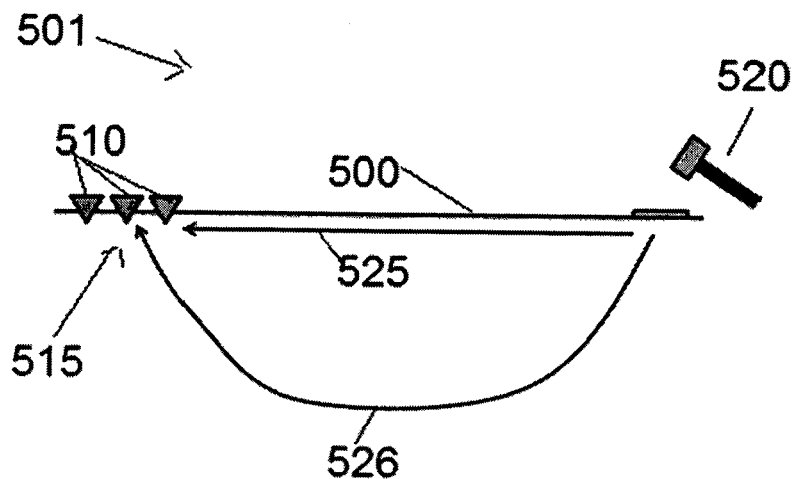
FIG. 5a illustrates a conventional survey system for determining structures of the Earth's near-surface using a sledgehammer as a source and FIG. 5b illustrates a survey system for the same purpose as in FIG. 5a, but using a geophone(s) as a source, in accordance with an embodiment of the present invention.

Referring to FIG. 5a, in the case for a survey 501 of the near-surface of the Earth, seismic receivers 510 are planted in the ground 500 at pre-defined locations 515, and a seismic source 520, such as a sledgehammer, vibrator etc., is used to generate seismic waves 525 and 526 that propagate through the near-surface of the Earth via two different paths, and are recorded at locations 515 by seismic receivers 510. By way of example, the near-surface of the Earth may refer to a shallow layer of the Earth that is of the order of hundreds of meters deep and may be less than a two or three hundred meters deep. These seismic waves may be body waves 526 or surface waves 525. Body waves 526 propagate into the near-surface subsurface structure and are reflected or refracted back to the surface. Surface waves 525 propagate laterally through the near-surface of the Earth. There are numerous methods by which near-surface structure can be extracted from these wave types 525 or 526. For body waves, see for example Yilmaz, O., 2001, *Seismic Data Analysis*, SEG, TULSA. Chapter 3, and for surface waves see for example Strobbia, C. et al., 2011, *"Attenuation of Aliased Coherent Noise: Model-Based Attenuation For Complex Dispersive Waves,"* FIRST BREAK, 29, no. 8.

Figure 5B:
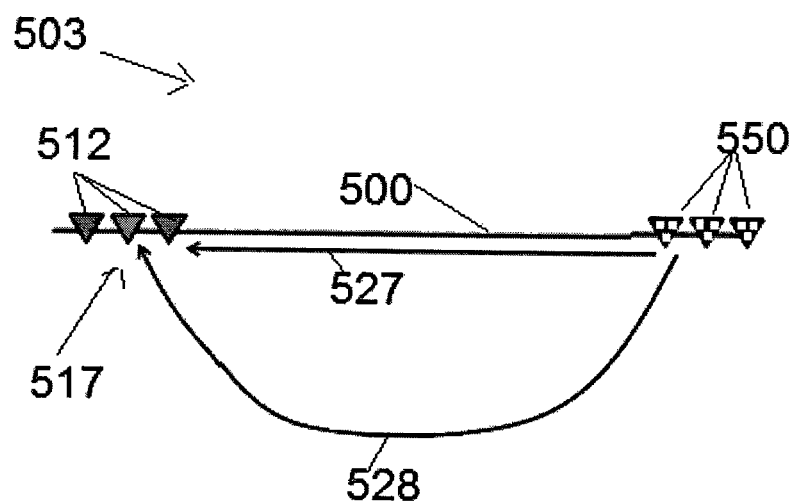

Referring to FIG. 5b, in a survey 503, in accordance with an embodiment of the present invention, instead of using a small seismic source 520, a plurality of seismic receivers 550 are grouped together and placed at the location where the seismic source 520 is supposed to be. The seismic receivers 550 may be connected to a recording device as regular receivers to record received seismic waves; they may also be connected to a source signal generator which supplies electric power to generate seismic waves. A controller may be3 used to control the function of each receiver 550, whether it acts as a receiver or a receiver-source and can switch between the two functions. In an embodiment of the present invention, when receiver-sources 550 act as sources, they are driven by a source signal or a signal sequence. As will be discussed below, in an embodiment of the present invention, the source signal or source signal sequence may be designed such that the source characters are the same as those of a seismic source 520, and the waves (527 or 528) recorded by receivers 512 at receiver locations 517 are the same as by receivers 510 at the same locations 515 in the survey 501 as shown in FIG. 5a.

In an embodiment of the present invention, the receivers 550 may have the same fundamental design as the receivers 512, but are used differently in the seismic survey. There may be many other receivers 512 in the survey 503, but they are not shown in the figure for simplicity.

In an embodiment of the present invention, to use a geophone (accelerometer, hydrophone etc.) as a seismic source, some sort of signal generator may be used to provide the driving signal and to apply this signal to the geophone. In an embodiment of the present invention, the driving signal may be of a form that allows the recorded seismic data to be interpreted. For example, in one aspect of the present invention, to generate a stronger seismic signal, the driving signal may be of a sufficiently high voltage to cause the mass suspended within the geophone to strike the top and the bottom of the geophone casing. In this example, the driving signal generates a series of impulses. However, each impulse may still be weak compared to a regular seismic source, such as a vibrator truck or a sledgehammer. In an example where the geophone is "over driven" like this, to improve the signal to noise ratio (and hence the ease of interpretation), the signal generator may emit numerous impulses.

In an embodiment of the present invention, the impulses may be separated in time, such that the resulting data may be stacked to improve the signal to noise ratio, or the impulses may be emitted in such a way that they form a random or pseudo-random sequence. In an embodiment of the present invention, such sequences have the property that their auto-correlation tends towards an impulse at zero-time lag. Hence, by cross-correlating the recorded data with the source sequence, the seismic data resembles that which would have been acquired using an impulsive source.

In an embodiment of the present invention, the source signal may be centralized and transmitted to a receiver-source via the same signal network in which a seismic signal is transmitted from the receiver to the data collection system. The source signal generator 155 (not shown in FIG. 1) may be located in a similar place as the data collection system (140 in FIG. 1).

In some embodiments, the source signal generator 155 may be distributed, e.g. using FIG. 1 as an example, among the survey array 110, near nodes 130 or data sources 120. In one embodiment of the present invention, a node 130 may contain a source signal generator 155 (not shown in FIG. 1) for supplying source signals to receivers 120 within its survey line 125. The source signal generator may have a power supplier that has enough electric power and a digital-to-analog converter (DAC) to amplify the source signal to activate the selected receiver to generate seismic waves. The receivers may be switched between the two different operating modes: as a receiver or as a source.

Figure 6A:
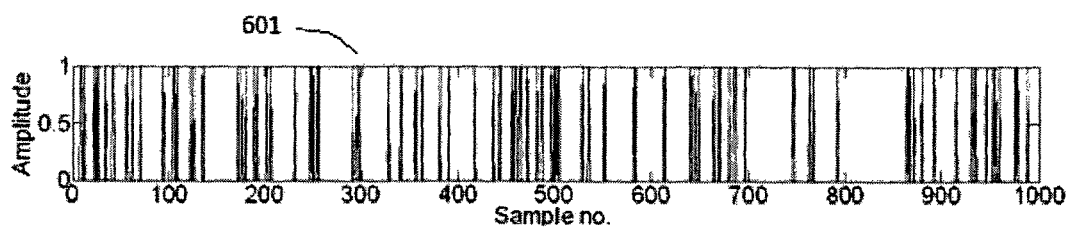
FIGS. 6a and 6b illustrate an example of a sequence and an auto-correlation of the sequence, where the sequence may be used in an embodiment of the present invention.
Figure 6B:
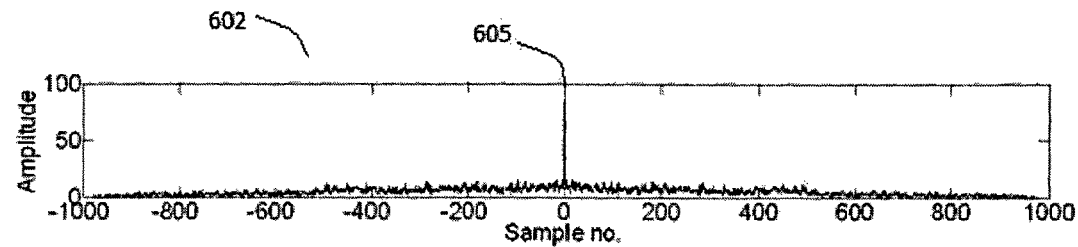

FIG. 6a illustrates a temporal sequence 601 generated using a pseudo-random integer generator in a computer, that may be used in an embodiment of the present invention. This sequence is 1000 samples long, and 100 impulses have been randomly assigned. FIG. 6b illustrates the auto-correlation 602 of sequence 601. The auto-correlation tends towards the desired spike 605 at zero correlation lag. It would be possible to use this temporal sequence 601. In one example, a computer may generate the sequence 601, and the computer is connected to a digital interface to turn on/off a voltage generator, which is used to drive the geophone to generate seismic impulses. In this example, the amplitude of each impulse may be the same.

Figure 7A:
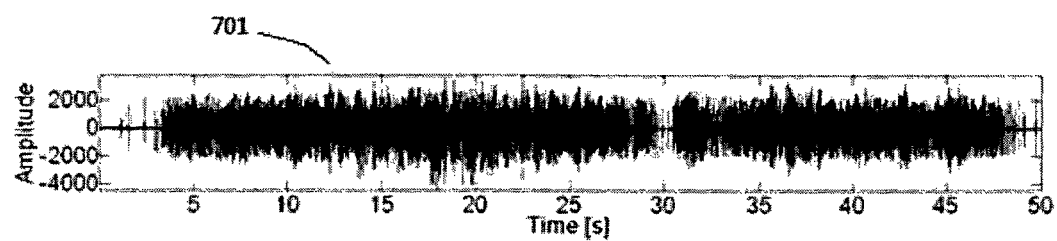
FIGS. 7a and 7b illustrate an example of an amplitude sequence and an auto-correlation of that sequence, where the sequence is used to drive geophones to make seismic waves, in accordance with an embodiment of the present invention.
Figure 7B:
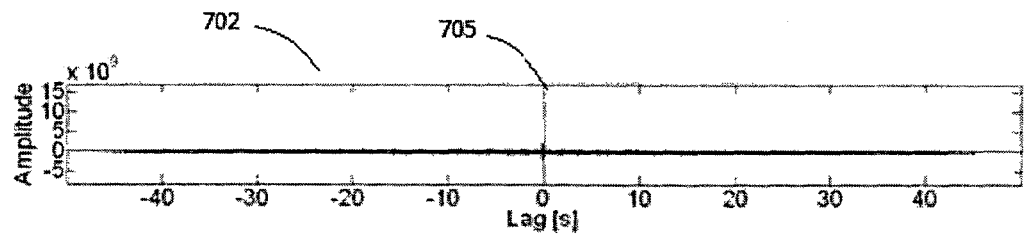

FIG. 7a shows a random source sequence 701 that may be used in an embodiment of the present invention, that was recorded on a pilot geophone (a geophone located next to the source geophone, which records the output sequence) and generated using an analogue signal generator. In this example, the sequence is 50 seconds long. The auto-correlation 702 of this sequence 701, as shown in FIG. 7b. The spike 705 indicates that the impulsive auto-correlation has been achieved. In this example, the analogue signal may be continuous while the amplitude is variable. This sequence may also be implemented using a digital computer and Digital-to-Analog converter (DAC). A sequence of random numbers is generated using the computer, and the sequence represents the amplitude of the driving voltage to the receiver-source. Then, the DAC converts a random number to a voltage proportional to the random number and drives the geophone at a uniform time interval. The geophone may generate seismic impulses according to the supplied voltages from the DAC.

Figure 8:
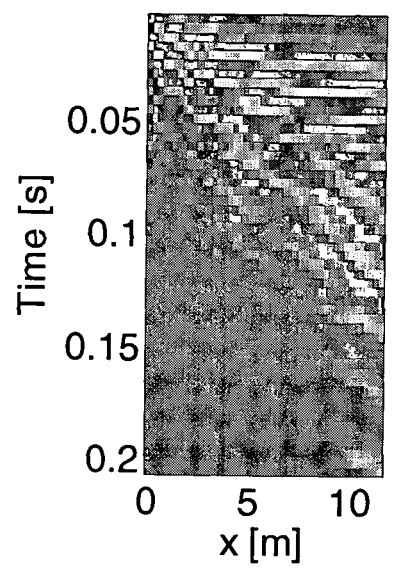
Figure 9:
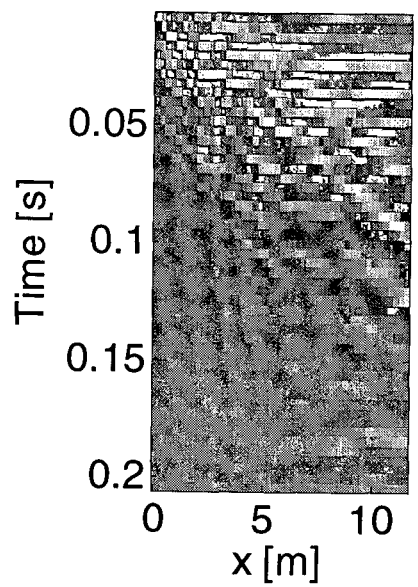
FIG. 9 illustrates an example of data produced by the sequence in FIG. 7a using the system illustrated in FIG. 5b, in accordance with an embodiment of the present invention.

FIG. 8 illustrates the processed seismic traces (image) of surface waves using a sledgehammer source 520 in the example survey 501 as in FIG. 5a. FIG. 9 illustrates the similar processed seismic traces recorded and processed using the source sequence in FIG. 7a in the example survey 503 as in FIG. 5b, in accordance with an embodiment of the present invention. The receiver sources 550 are a group of four closely spaced geophones in the survey 503. The average amplitudes of spectrum/spectra of FIGS. 8 and 9 are equalized for easy comparison. In both of these plots, surface waves propagating from 0 s at 0 m offset, to around 0.1 s at 11.5 m offset, as well as body waves, which are observed as the flat events between 0.02 and 0.05 s, may be observed. Thus, in an embodiment of the present invention, waves from the geophone sources may be used in the same way as waves from an impulsive source (e.g. the sledgehammer source, the vibroseis truck or the like).

While the examples in FIG. 9 and FIG. 5b aim to replicate the data generated using a conventional point source as in FIG. 8 and FIG. 5a, the methods or systems disclosed in this specification are not limited to such application(s). In some embodiments, the seismic receivers used as sources may be used in many other ways and may generate wavefields in surveys that conventional seismic sources cannot generate. In embodiments of the present invention, the seismic receivers used as sources may also have many other applications that may, among other things, make the seismic survey more efficient.

Figure 10A:
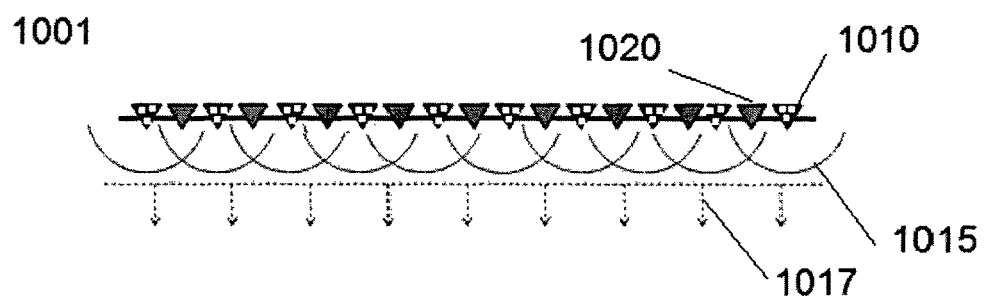
FIGS. 10a and 10b illustrate two examples of receivers used as sources, in accordance with an embodiment of the present invention.
Figure 10B:
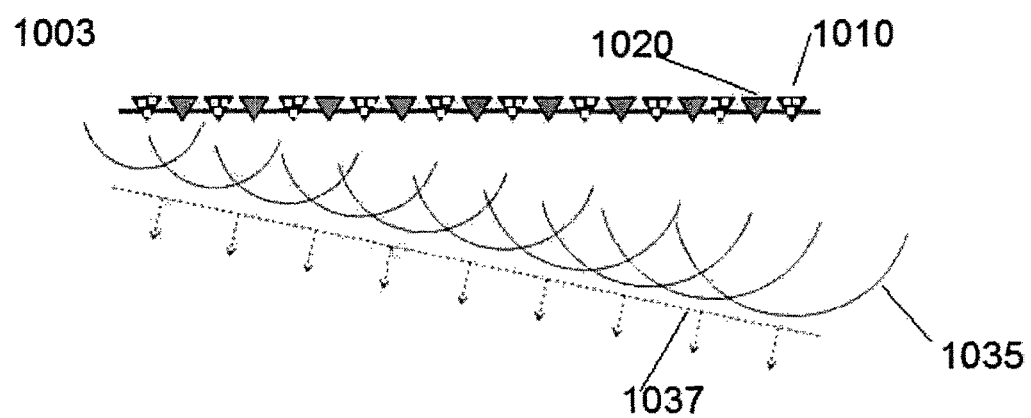

Referring to FIGS. 10a and 10b, the receiver-sources, in accordance with embodiments of the present invention, may be used to generate plane waves, rather than the conventional spherical waves produced in prior systems using point sources. In these examples, in accordance with embodiments of the present invention, an array 1001 comprises seismic receivers 1010 and 1020. In an embodiment of the present invention, half of the receivers 1010 (spotted triangles) may act as sources and half of the receivers 1020 (gray triangles) may record the resulting wavefields. In such embodiments, one or more devices that were in previous arrangements used as seismic receivers are used as seismic sources. Moreover, in such embodiments, the array comprises a mix of seismic sources and seismic receivers.

In an embodiment of the present invention, each receiver-source 1010, when driven by an electric signal, may generate a small wave 1015 similar to a small point source. In an embodiment of the present invention, when all the receiver-sources 1010 and/or a plurality of the receiver/sources 1010 are driven by the same sequence, the combination of the multiple small spherical wave fronts 1015 forms a plane wave 1017, as illustrated in FIG. 10a. In an embodiment of the present invention, acquisition and processing of this plane wave data may differ from the acquisition and processing of the conventional data illustrated in in FIG. 8.

In an embodiment of the present invention, if time shifts are applied to each of the receiver-sources 1010 (source geophones), then the plane wave can be given a specific direction. In FIG. 10b, a constant time delay is applied to all the receiver-sources 1010, so the plane wave 1037 is moving towards the left. For simplicity, FIGS. 10a and 10b illustrate only a single line of receivers. However, in an embodiment of the present invention where a 2D array of the receiver-sources 1010 is laid at the surface of the Earth, the receiver-sources 1010 illuminate the subsurface in 3D. In an embodiment of the present invention, different time-shifts may be applied to the receiver-sources 1010 to produce more sophisticated wavefronts. For example, in an embodiment of the present invention, subsurface measurements may be acquired by illuminating the subsurface using a plurality of plane waves emitted in different directions. In an embodiment of the present invention, this illumination of the subsurface using directionally different plane waves may help a geophysicist or the like "see" the subsurface structure from different angles.

In another example, in accordance with an embodiment of the present invention, a dense array of seismic receivers may be used in which some selected receivers within the array may be activated as sources at any time, while being used as receivers at other times. The wavefields generated from these "receiver-sources" are received by other receivers within the array. Such signals generated from the receiver-sources may provide information about the local area/ volume around the receiver-sources without additional equipment or surveying time. In an embodiment of the present invention, the receiver-sources may be integrated with other parts of a conventional seismic acquisition system. In an embodiment of the present invention, selected receivers may be activated as "mini-seismic sources" at selected times to provide near-surface information for the conventional seismic acquisition system.

In one embodiment of the present invention, the waves generated by the receiver-sources do not resemble the waves by regular seismic sources, such as sledge hammers, explosions or the like. In some embodiments, the waves may be used to simulate other sources. For example, there are a number of methods where near-surface structure can be extracted from ambient noises. These methods rely on the ambient noise field meeting certain assumptions. In an embodiment of the present invention, the geophone sources (receiver-sources) may be used to provide a pseudo-noise field that meets these assumptions.

Figure 11A:
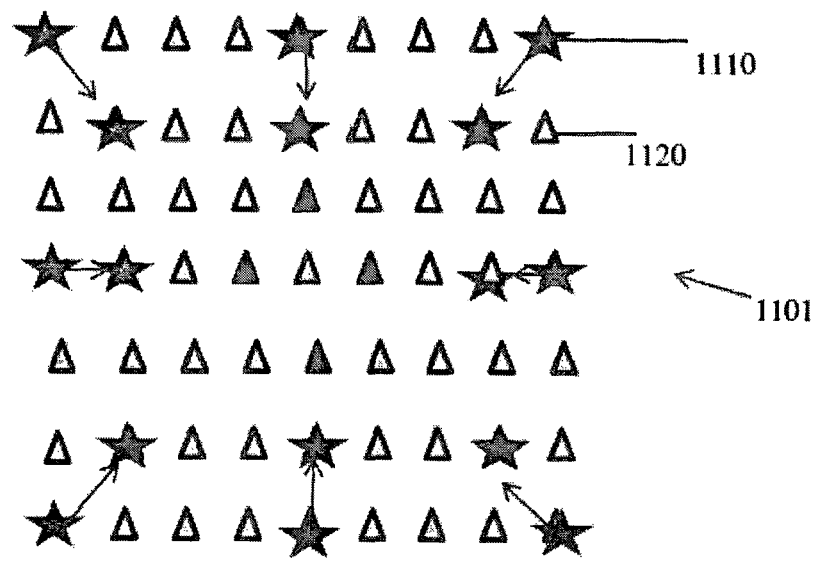
FIGS. 11a and 11b illustrate two examples of receiver spreads with receiver-sources, in accordance with an embodiment of the present invention.
Figure 11B:
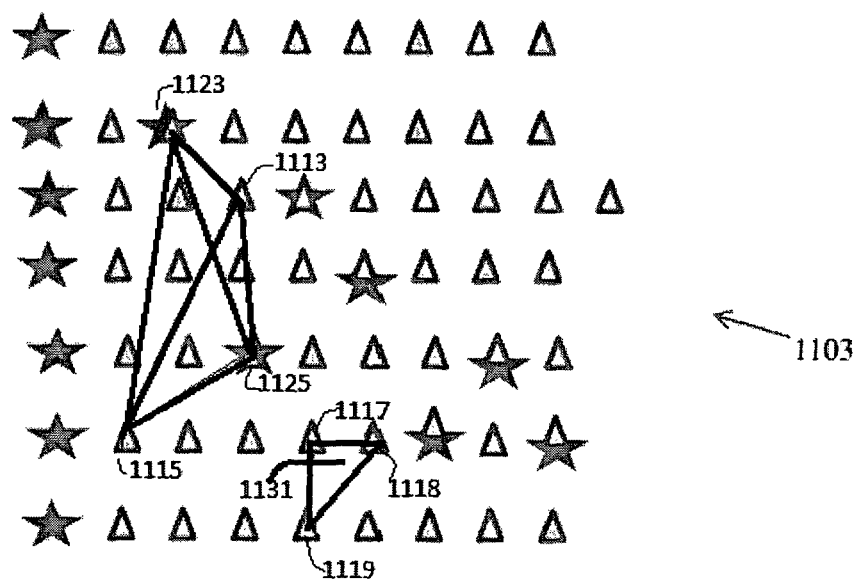

For example, in an embodiment of the present invention, the receiver-sources may be driven in sequence from the outside of the receiver array inward; as if a seismic wave or noise wave is propagating from outside the array inward towards the center of the array, e.g. as illustrated in FIG. 11a. A 2D receiver array 1101 has many receivers (stars) 1110 and (triangles) 1120. In an embodiment of the present invention, a selected few receivers (stars) are used as sources 1110 and the remaining receivers (triangles) are used as receivers 1120. In an embodiment of the present invention, the sources 1110 are activated according to a sequence to simulate a noise wave traveling inwards towards the center of the array. In aspects of the present invention, the sequence is in two space dimensions (i.e. receivers are selected in the 2D array) and one time dimension. In embodiments of the present invention, the generated wavefront may be circular (e.g. as illustrated in FIG. 11a), linear (e.g. as illustrated in FIG. 11b, from left to right) or any other desired shape, and the generated wavefront sweeps through the surface covered by the receiver array.

To simulate a different kind of noise, different receivers may be selected according to a different activation sequence. When the receivers are not activated as sources at any given time, they may be used as regular receivers to record the wavefields at that time; whether the wavefields are due to the receiver-sources or regular seismic sources. As such, in embodiments of the present invention, the entire survey system may remain virtually the same despite the additional measurements that can be made. Additional time needed to acquire the new measurements, in accordance with embodiments of the present invention, is also close to zero. As such, embodiments of the present invention provide seismic array arrangements that are similar or the same in arrangement as conventional arrays, but can provide additional information.

The receiver-sources of embodiments of the present invention may also be used for managing the seismic-survey-receiver-array itself. The receiver-sources within the receiver array may form source-receiver networks, e.g. as illustrated in FIG. 11b. A few (at least two) selected receivers (e.g. 1123, 1125) may be activated as sources, whose waves are received by receivers (e.g. 1113, 1115). From these networks, one or more nodes (i.e. locations of each receiver or receiver-source 1113, 1115, 1123 and 1125) may be uniquely identified as to their physical locations. For example if the wave propagation velocity is known, or can be estimated, simple triangulation methods can be used to locate source-receivers using signals generated by the source-receivers.

In embodiments of the present invention, other methods to determine the physical locations of the source-receivers may involve simultaneously determining the near-surface velocity structure and the physical locations. This locating process may be performed using an inverse theory approach, for example Spencer and Gubbins outline a procedure to determine source positions and velocity structure in an Earthquake seismology setting, and, in aspects of the present invention, a similar approach may be used with the source-receiver array. (See D. Gubbins and C. Spencer, 1980, *Travel-Time Inversion for Simultaneous Earthquake Location and Velocity Structure Determination in Laterally Varying Media*, GEOPHYSICAL JOURNAL OF THE ROYAL ASTRONOMICAL SOCIETY, Vol. 63, pp 95-116).

In embodiments of the present invention, in a land seismic survey, a plurality of receiver sources may be distributed through the seismic array with the other receivers. This may allow for location of seismic sources in new positions in the array compared to a conventional seismic array. In turn, this distribution of receiver-sources in the array may, in embodiments of the present invention, provide for obtaining information about the near surface of the Earth, determining array geometry and position of array elements during a seismic survey and/or the like. Similarly, in a marine seismic survey receiver-sources may be distributed with other receivers in the seismic array. This may, in some aspects, provide for locating, receiver-sources in the seismic streamers/cables used in the marine seismic survey. In embodiments of the present invention, in both the seismic and land seismic surveys using receiver-sources, two seismic wavefields are produced in the Earth's subsurface by the seismic array, one seismic wavefield produced by the conventional seismic source (an airgun, vibroseis device, hammer, marine vibrator system and/or the like) and another seismic wavefiled produced by the receiver-source(s).

In embodiments of the present invention, the locating of the source-receivers may be used as a QA/QC tool for verifying receiver locations or as a surveying tool to uniquely identify each receiver/source location when other surveying tools are not available or not adequate. In some embodiments, the locating of receivers using the source-receivers may be used in real-time to verify the receiver locations or to determine the receiver locations for the first time, which may save the time and effort in determining the receiver locations. In some cases, a receiver (e.g. 1131) may contain several sensors/receivers (e.g. sensors 1117, 1118 and 1119). In some embodiments of the present invention, in addition to determining the positions of each sensor/receiver, the relative positions or orientations of sensors (e.g. sensors 1117, 1118 and 1119) the orientation of sensors within a receiver (e.g. receiver 1131 comprises three sensors 1117, 1118 and 1119) may be determined. In aspects of the present invention, the determination of orientation/location of individual sensors in a receiver provides that the orientation of the multi-sensor receiver (e.g. the orientation of receiver 1131) may itself be determined.

In embodiments of the present invention, the driving signal or signal sequence applied to the receiver-sources may be a random or a pseudo-random sequence as illustrated in FIG. 6a or 7a. In aspects of the present invention, the sequence may be a time sequence 601 (random time interval) as in FIG. 6a, or an amplitude sequence (random amplitude) as in FIG. 7a. The signal sequence may also be any other sequences, e.g. orthogonal sequences that are orthogonal between each other and the regular seismic survey. Furthermore, the sequence may have multiple dimensions in space and/or time as in FIG. 11a.

In embodiments of the present invention, the driving signals to the receiver-sources may comprise selective frequency ranges, such as low frequencies of 0-5 Hz, high frequencies, and/or a particular band selected/determined for studying certain types of near-surface structures of the Earth. In an embodiment of the present invention, the driving signal applied to the receiver-sources is selected so that the receiver-sources produce signals with frequency ranges that provide for isolating data generated by the receiver-sources from the regular seismic data generated by the regular sources in the seismic array.

In embodiments of the present invention, the driving signals to the receiver-sources may have a desired wavelet signature to create a source, the receiver-source, that produces such a wavelet signature (e.g. a non-impulse source). For example, in aspects of the present invention, the drive signal applied to the receiver-source produces a shaped source spectrum by varying the repetition rate of the impulses emitted by the receiver-source (a geophone etc.).

In embodiments of the present invention, the receiver-sources may be regular receivers, which are inverted to become sources only temporarily. In these embodiments, the seismic receivers have dual uses: as a seismic receiver when the receiver is not being driven and as a seismic source when the receiver is being driven. In some embodiments of the present invention, a receiver, such as a geophone, may be permanently converted to serve as a seismic or a "mini-seismic source." In such cases, seismic source is dedicated and optimized to be a source, rather than as a recording device. Such seismic sources may have different electro-mechanical components than regular seismic receivers that may, for example, withstand higher activation electric power and generate more seismic energy. In embodiments of the present invention, the "mini-seismic sources" may be deployed together with regular receivers as part of the seismic spread/array. One such mini-seismic source may be a small electromagnetic vibrator that may be used in the seismic spread/array.

While cross-correlation is a simple method to produce the resulting data as in FIG. 8 among others, it is not the only choice to process the data acquired from receiver-sources. In embodiments of the present invention, other methods, such as for example de-convolution methods, may be used to produce impulsive data from such receiver-sources.

Figure 12:
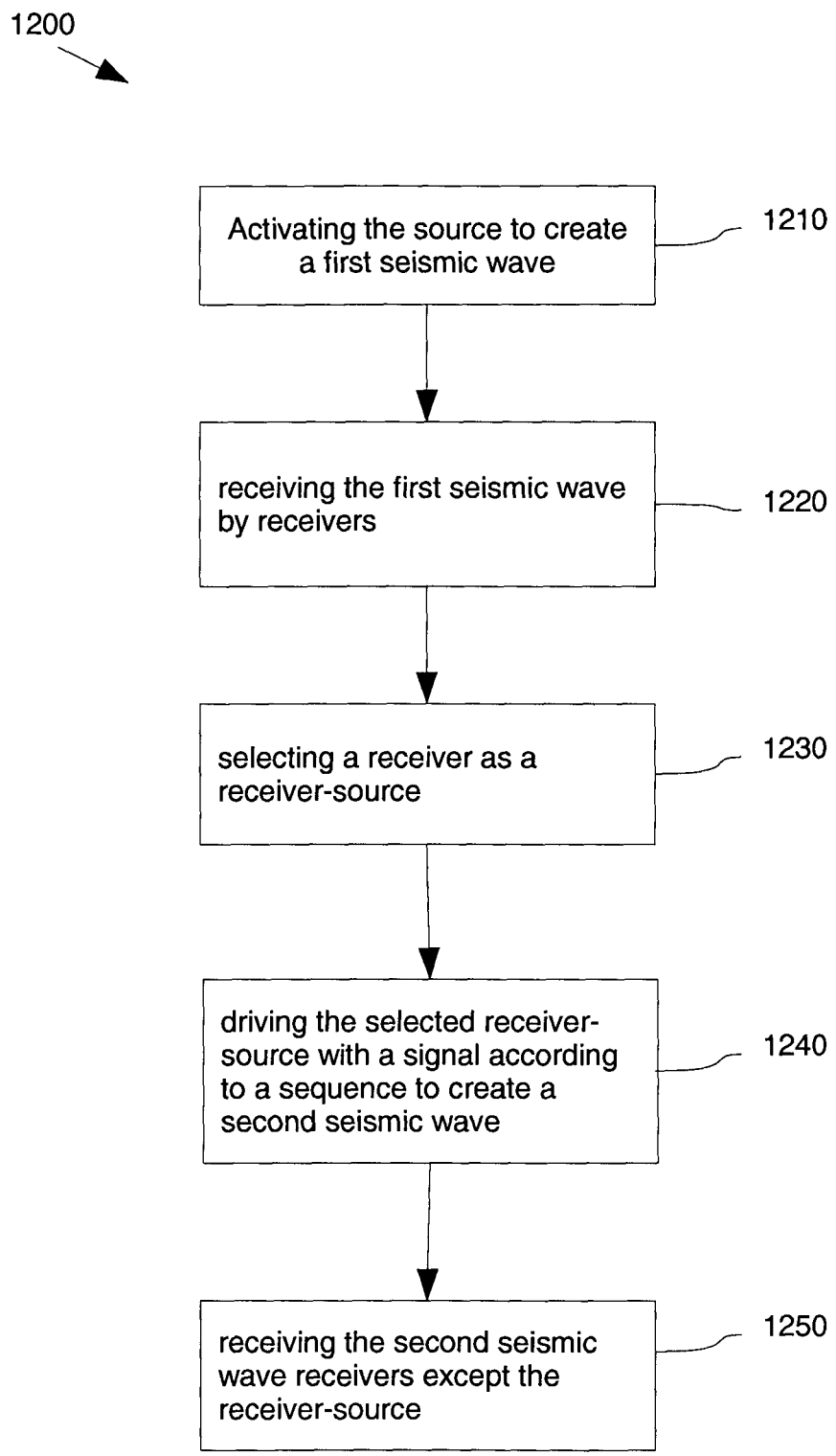
FIG. 12 illustrates a flow diagram of a method to use receivers as sources, in accordance with an embodiment of the present invention.

Some embodiments of the present invention for using receiver-sources in a seismic survey are illustrated in FIG. 12. The illustrated method 1200 may proceed as follows:

during a seismic survey, activating a seismic source to create a first seismic wave 1210, wherein the seismic survey comprises using a seismic array comprising one or more seismic sources and a plurality of seismic receivers to determine properties of a section of a subsurface of the Earth;

receiving the first seismic wave using the plurality of seismic receivers 1220;

within the seismic survey receiver array, selecting one or more receivers as a receiver-source 1230;

driving the selected receiver-source with a signal according to a sequence to create a second seismic wave 1240; and receiving the second seismic wave using the plurality of receivers 1250.

In some embodiments of the present invention, the receiver-source is driven with a sequence or an encoded sequence. The second seismic wave measurement may be obtained by decoding with the encoded sequence. In embodiments of the present invention, The second seismic wave measurement may reveal characteristics/properties of the Earth structure, e.g. near-surface structure, properties of the receiver array, e.g. receiver locations, and/or the like. The activating of a regular seismic source is for performing the regular seismic survey for acquiring seismic data of the subsurface Earth. In some cases where only the near-surface structure of the Earth is of interest, then the regular seismic sources may not be needed. In such embodiments, only the receiver-sources are used and the method 1200 is simplified.

The method 1200 may include more operations, for example, the signal that drives the receiver-source may be amplified to increase the energy output of the created seismic wave. In some embodiments of the present invention, the receiver-source may be driven by a drive sequence or a related sequence to form a desired wavefront.

In embodiments of the present invention, the near-surface dataset may be used for extracting near-surface properties, such as velocity maps, static profiles, near-surface reflections and structural details. Images of such structures in the Earth may then be created from the dataset.

In embodiments of the present invention, to obtain deeper profiling, long source functions and dedicated efficient sources may be used. Such dedicated sources may have the same mechanics as conventional seismic receivers, but such dedicated sources may be designed to create seismic waves rather than to receive seismic waves.

As those with skill in the art will understand, one or more of the steps of methods discussed above may be combined and/or the order of some operations may be changed. Further, some operations in methods may be combined with aspects of other example embodiments disclosed herein, and/or the order of some operations may be changed. The process of measurement, its interpretation, and actions taken by operators may be done in an iterative fashion; this concept is applicable to the methods discussed herein. Finally, portions of methods may be performed by any suitable techniques, including on an automated or semi-automated basis on computing system 1300 in FIG. 13.

Figure 13:
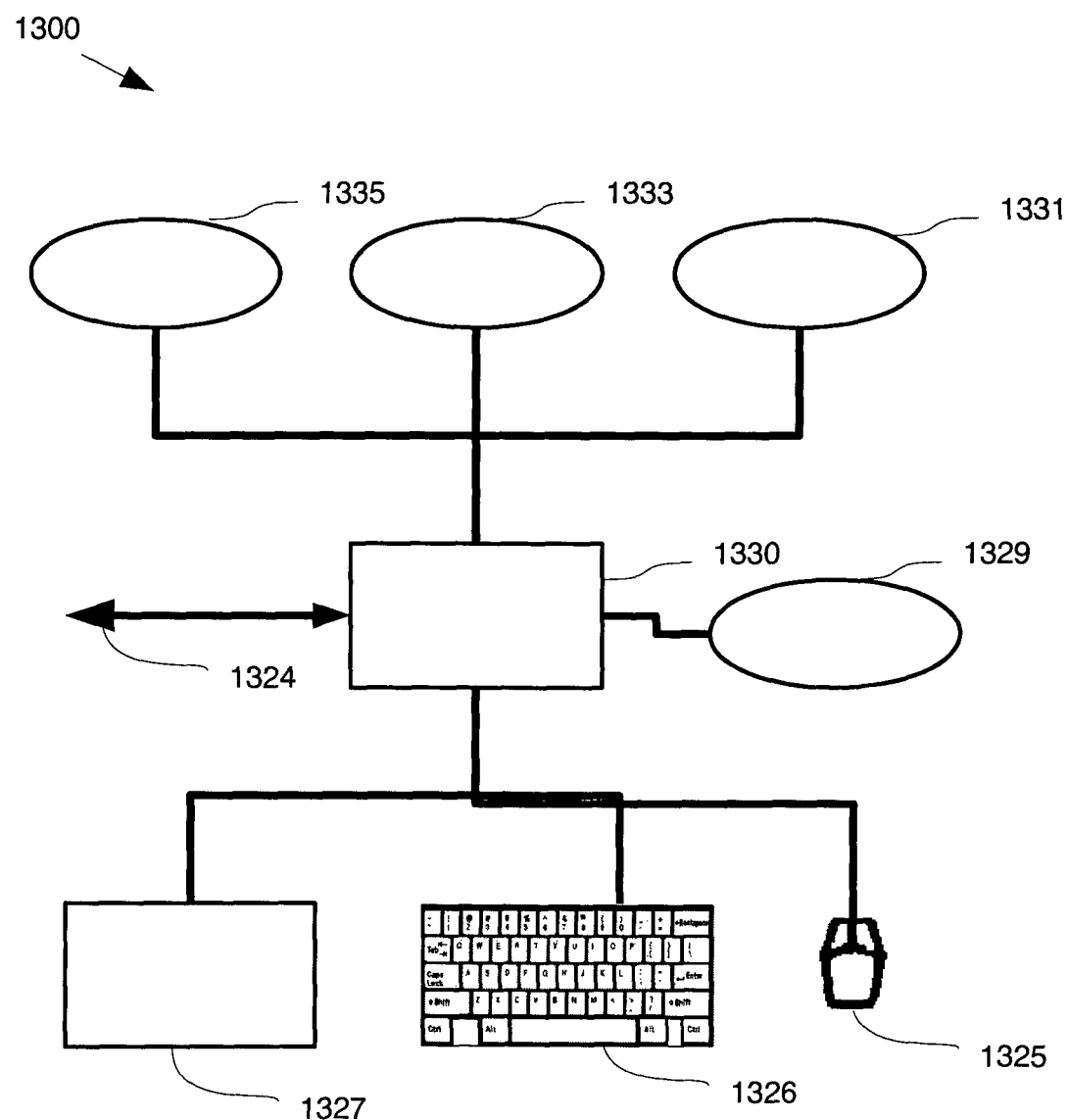
FIG. 13 illustrates an example computer system to implement parts of the methods, in accordance with an embodiment of the present invention.

Portions of methods described above may be implemented in a computer system 1300, one of which is shown in FIG. 13. The system computer 1330 may be in communication with disk storage devices 1329, 1331, 1333 and 1335, which may be external hard disk storage devices and measurement sensors (not shown). It is contemplated that disk storage devices 1329, 1331, 1333 and 1335 are conventional hard disk drives, and as such, may be implemented by way of a local area network or by remote access. While disk storage devices are illustrated as separate devices, a single disk storage device may be used to store any and all of the program instructions, measurement data, and results as desired.

In one implementation, real-time data from the receivers may be stored in disk storage device 1331. Various non-real-time data from different sources may be stored in disk storage device 1333. The system computer 1330 may retrieve the appropriate data from the disk storage devices 1331 or 1333 to process data according to program instructions that correspond to implementations of various techniques described herein. The program instructions may be written in a computer programming language, such as C++, Java and the like. The program instructions may be stored in a computer-readable medium, such as program disk storage device 1335. Such computer-readable media may include computer storage media. Computer storage, media may include volatile and non-volatile media, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 1330. Combinations of any of the above may also be included within the scope of computer readable media.

In one implementation, the system computer 1330 may present output primarily onto graphics display 1327, or via printer (not shown). The system computer 1330 may store the results of the methods described above on disk storage 1329, for later use and further analysis. The keyboard 1326 and the pointing device (e.g., a mouse, trackball, or the like) 1325 may be provided with the system computer 1330 to enable interactive operation.

The system computer 1330 may be located on-site, e.g. as part of processing unit 140 in the record truck 105 as in FIG. 1 or at a data center remote from the field. The system computer 1330 may be in communication with equipment on site to receive data of various measurements via network interface 1324.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method of carrying out a seismic survey, the method comprising:
   providing a seismic array which comprises a plurality of seismic receiver-sources selectively operable via function control to emit or receive seismic signals;
   driving a set of seismic receiver-sources in the plurality of seismic receiver-sources according to a sequence to produce a seismic signal in the Earth, the signal being other than and distinguishable from a point source signal;
   using at least one of the seismic receiver-sources in the plurality of seismic receiver-sources, other than those seismic receiver-sources in the set, to receive seismic data generated by the seismic signal, wherein the seismic data comprise reflections of the seismic signal from a section of a subsurface of the Earth; and
   using the received seismic data to determine properties of the section of the subsurface of the Earth.

2. The method of claim 1, wherein the section of the subsurface of the Earth comprises a near-surface structure of the Earth which is less than three hundred meters in depth.

3. The method of claim 1, further comprising:
   driving a first seismic receiver-source in the set to produce a first seismic signal and driving a second seismic receiver-source in the set to produce a second seismic signal;
   using one or more of the seismic receiver-sources in the plurality of seismic receiver-sources, other than those seismic receiver-sources in the set, to receive a first dataset of seismic data generated by the first seismic signal;
   using one or more of the seismic receiver-sources in the plurality of seismic receiver-sources, other than those seismic receiver-sources in the set, to receive a second dataset of seismic data generated by the second seismic signal; and
   determining positions of seismic receiver-sources using the first and the second datasets of seismic data.

4. The method of claim 1, wherein at least one of the seismic receiver-sources comprises a multiple-sensor receiver-source.

5. The method of claim 1, further comprising:
   activating a seismic source to produce a source seismic signal in the Earth; and
   using one or more of the seismic receiver-sources, other than those seismic receiver-sources in the set, to receive source seismic data generated by the source seismic signal.

6. The method of claim 5, further comprising:
   using at least one of the source seismic data or the seismic data to generate an image of an interior section of the Earth.

7. The method of claim 1, wherein each seismic receiver-source comprises at least one of a geophone, a hydrophone, or an accelerometer.

8. The method of claim 1, further comprising:
   activating a seismic source to produce a source seismic signal in the Earth;
   using one or more of the seismic receiver-sources, other than those seismic receiver-sources in the set, to receive source seismic data generated by the source seismic signal; and
   using the sequence to decode the source seismic data.

9. The method of claim 1, wherein the sequence comprises at least one of a time sequence, an amplitude sequence, a frequency sequence, or a spatial sequence having two space dimensions and one time dimension.

10. The method of claim 1, wherein driving the set to produce the seismic signal in the Earth comprises:
    selecting seismic receiver-sources in the plurality of seismic receiver-sources to be driven according to the sequence to produce the seismic signal.

11. The method of claim 1, wherein the sequence comprises a sequence in two dimensions and in time.

12. The method of claim 1, wherein the seismic signal comprises one of a plane wave, a plane wave with an angled direction, or a surface wave converging towards a point inside the receiver array.

13. The method of claim 1, wherein the set is driven by a source signal generator.

14. The method of claim 13, wherein the source signal generator is one of a centralized source signal generator or a distributed source signal generator.

15. The method of claim 13, wherein the source signal generator comprises a power supplier and a digital-to-analog converter.

16. The method of claim 1, further comprising:
using at least one of the seismic receiver-sources in the plurality of seismic receiver-sources, other than those seismic receiver-sources in the set, to receive seismic data generated by the seismic signal, wherein the seismic data comprise the seismic signal; and
using the received seismic data to determine a location of at least one seismic receiver-source in the plurality of seismic receiver-sources.

17. The method of claim 1, wherein the sequence comprises a series of seismic signals over a period of time, the signals are randomly spaced in time or have random differences in amplitude, and the method comprises correlating received seismic data with the seismic signals.

18. The method of claim 1, wherein at least one seismic receiver-source of the set comprises an inverted geophone.

19. A seismic survey system, comprising:
a seismic source configured to generate source seismic waves in the Earth;
a plurality of receiver-sources which are seismic receivers selectively operable to emit or receive a seismic signal and which are configured to be driven to produce receiver-source seismic waves in the Earth;
an array of receivers configured to receive seismic waves, wherein the seismic waves comprise at least one of the source seismic waves, waves generated by interaction of the source seismic waves with an interior section of the Earth, the receiver-source seismic waves, or waves generated by interaction of the receiver-source seismic waves with the interior section of the Earth; and
a controller configured to drive the plurality of receiver-sources according to a sequence to produce the receiver-source seismic waves in the Earth as one of a plane wave, an angled plane wave, or a surface wave converging towards a point inside the array of receivers;
wherein the receiver-source seismic waves are distinguishable from the source seismic waves.

20. The system of claim 19, wherein at least one but not all of the plurality of receiver-sources is configured in use to receive the source seismic waves and the waves generated by interaction of the source seismic waves with the interior section of the Earth.

21. The system of claim 19, further comprising:
a processor configured to process the seismic waves to determine at least one of properties of the interior section of the Earth or an image of the interior section of the Earth.

22. The system of claim 19, wherein the array of receivers comprises at least one but not all of the plurality of receiver-sources, the at least one receiver-source being configured in use to receive the seismic waves.

23. The system of claim 19, wherein the receiver-sources comprise at least one of a geophone, a hydrophone, an accelerometer, or a combination thereof.

24. The system of claim 19, wherein the sequence comprises two dimensions in space and one dimension in time.

25. The system of claim 19, wherein the controller comprises a source signal generator.

26. The system of claim 19, wherein at least one of the receiver-sources comprises at least one of a geophone, a hydrophone, or an accelerometer, and wherein the at least one of the receiver-sources has been adapted to function solely as a source.

27. A method of carrying out a seismic survey, the method comprising:
providing a seismic array which comprises a plurality of receiver-sources each selectively operable to emit or receive a seismic signal;
driving a set comprising at least one receiver-source in the plurality of receiver-sources according to a sequence to produce a series of seismic signals in the Earth, the sequence being such that the signals are randomly spaced in time or have random differences in amplitude, and the signals being other than and distinguishable from point source signals;
using at least one of the receiver-sources in the plurality of receiver-sources, other than those receiver-sources in the set, to receive seismic data generated by the seismic signals, wherein the seismic data comprise reflections of the seismic signals from a section of a subsurface of the Earth;
correlating received seismic data with the seismic signals produced by the receiver-sources; and
using the received seismic data to determine properties of the section of the subsurface of the Earth.

* * * * *